Patented July 6, 1943

2,323,651

UNITED STATES PATENT OFFICE 2,323,651

THERAPEUTICALLY VALUABLE COMPOUNDS AND A METHOD OF PRODUCING THE SAME

Max Dohrn, Berlin-Charlottenburg, and Paul Diedrich, Finkenkrug, Osthavelland, Germany, assignors, by mesne assignments, to Schering Corporation, Bloomfield, N. J., a corporation of New Jersey No Drawing. Application June 10, 1937, Serial No. 147,478. In Germany June 15, 1936

14 Claims. (Cl. 260—397.7)

The present invention relates to therapeutically valuable compounds and the method of producing the same. The compounds to be produced according to the present invention possess the general formula R—Q—R'.

In this general formula Q stands for one of the following groups:

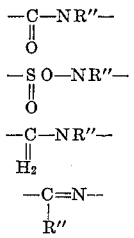

The present invention relates therefore to compounds of the following types:

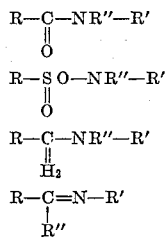

In these formulas R stands for an organic radical which contains a group capable of forming salts or for a group which can be converted into a group capable of forming salts. In the said organic radical further substituents may be present.

R' indicates an organic radical which is substituted by at least one sulfone amide group or by a group which can be converted into the sulfone amide group. In the case that Q stands for

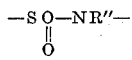

R' may also indicate hydrogen or any hydrocarbon radicals.

R" stands for hydrogen or any hydrocarbon radical.

Compounds which have proven to be of especial value are those wherein R and/or R' are of aromatic nature, wherein the substituents present in the aromatic nucleus are suitably arranged in para-position to each other. R and R' may, however, also be of heterocyclic or aliphatic nature; similar considerations apply to R".

The production of the compounds referred to above may be carried out according to methods known per se. Thus, for instance, suitable halogen derivatives, carbonic acid or sulphonic acid chlorides, carboxylic acid anhydrides, carboxylic acid aldehydes or carboxylic acid ketones can be caused to react with the corresponding amino compounds.

The following examples serve to illustrate the process of the present invention without, however, limiting the same to them.

Example 1

17.2 g. 4-amino benzene sulphone amide, obtained from the corresponding sulphone chloride and ammonia, are finely powdered with 11.2 g. succinic acid anhydride and heated to 170–180° for one hour. The reaction product is taken up with diluted sodium carbonate solution, the solution obtained is filtered and the acylated product precipitated by the addition of an acid. By recrystallization from water the N-(4-sulphamido benzene-) succinic acid mono amide in the form of colorless crystals of M. P. 211° is obtained in yield.

Example 2

The carefully pulverized mixture of 17.2 g. 4-amino benzene sulphone amide and 14.8 g. phthalic acid anhydride is heated to 200° for one hour. The reaction product is taken up with sodium carbonate solution, precipitated therefrom by the addition of an acid and recrystallized from alcohol. The N-(4-sulphamido benzene)-phthalic acid mono amide forms colorless needles which decompose at 317°.

Example 3

22.1 g. m-benzoic acid sulphochloride and 34.4 g. 4-amino benzene sulphone amide are heated to 170° for one hour. After cooling the solid mass formed is ground and stirred with water. The undissolved portion is filtered off and recrystallized from diluted alcohol. The acid formed is obtained in colorless needles of M. P. 256°; the alkali salts of the acid are easily soluble in water. The yield is approximately quantitative.

Example 4

19.3 g. 3-nitro phthalic acid anhydride are melted at 180° and while stirring 17.2 g. 4-amino benzene sulphone amide are added all at once. Heating is continued until the oily mass solidifies. After cooling the solid reaction product is pulverized and dissolved in aqueous suspension with the necessary amount of sodium hydroxide lye. After filtering the solution is acidified and the precipitate obtained recrystallized from diluted alcohol. The n-(4'-sulphamido benzene-)3 nitro phthalic acid 2-mono amide melts at 259–260°.

Example 5

23.8 g. 3,5-dinitro phthalic acid anhydride are melted and mixed with 17.2 g. 4-amino benzene sulphone amide. The brownish mass which after a short heating to 170–180° has soon become solid is worked up as described in Example 4. After recrystallizing from 50% alcohol the n-(4'-sulphamido benzene-)3,5-dinitro phthalic acid 2-mono amide is obtained in the form of colorless prisms of 274–275° (with decomp.).

Example 6

17.2 g. 4-amino benzene sulphone amide, 15 g. isophthalic aldehyde acid and 150 ccs. absolute alcohol are heated to boiling for 3 hours. After standing for 24 hours the mass crystallized out is isolated and recrystallized from water. The 4-sulphamido-3'-carboxylic-1'-benzal-aniline obtained melts at 202°.

Of course, various modifications and changes in the reaction conditions etc. may be made by those skilled in the art in accordance with the principles set forth herein and in the claims annexed hereto.

Thus, for example, instead of the reaction component referred to above other compounds may be used likewise for carrying out the process of the present invention, for instance, amino benzyl sulphone amide, 1,4-amino naphthalene sulphone amide, amino quinoline sulphone amide, amino carbazol sulphone amide, amino ethyl sulphone amide or the derivatives of the same substituted in the sulphone amide group by hydrocarbon radicals such as the methyl-, ethyl-, diethyl-amides and the like, or the anhydrides or half-halogenides of sulphone acetic acid, methionic acid, toluene sulphone carboxylic acid, quinolic acid and the like.

The therapeutically valuable compounds obtained according to the present invention are particularly suitable for intravenous and subcutaneous application as their salts, especially their alkali salts, are water soluble with neutral reaction. The already known benzene sulphone amides as well as the basic derivatives therefrom on the other side are soluble in water only in the form of salts showing a strong acid reaction, for instance the hydrochlorides, or in the form of salts showing an alkaline reaction, for instance the alkali compounds; this is a disadvantage which excludes the intravenous or subcutaneous application of the said known compounds. The new compounds obtainable according to the process of the present invention therefore on account of their general applicability doubtless possess a higher therapeutical value than the compounds known up till now.

What we claim is:

1. Therapeutically valuable compounds of the general formula $$R-\underset{\underset{O}{\|}}{S}O-NR''-R'$$

in which R stands for a radical taken from the class consisting of aromatic and heterocyclic radicals substituted by at least one acid group taken from the class consisting of sulphonic and carboxylic capable of forming salts, R' indicates an organic hydrocarbon radical having at least one sulphone amide group attached to carbon of said radical, and R'' stands for a group taken from the class consisting of hydrogen and hydrocarbon, the sulphone amide group being in para position to the NR'' group.

2. The neutral water-soluble salts of the compounds specified in claim 1.

3. The neutral water-soluble alkali metal salts of the compounds specified in claim 1.

4. A method of producing therapeutically valuable compounds of the general formula

RSO₂NR''R'

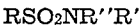

in which R is a radical taken from the class consisting of aromatic and heterocyclic radicals substituted by at least one acid group taken from the class consisting of sulphonic and carboxylic capable of forming salts, R' indicates an organic hydrocarbon radical having at least one sulphone amide group attached to carbon of said radical, and R'' is a radical taken from the class consisting of hydrogen and hydrocarbon radicals, which comprises mixing a compound taken from the class consisting of an acid halide of the general formula RSO₂Hal and the corresponding anhydride with an amino compound of the general formula NHR''R' and heating to cause a reaction to take place therebetween.

5. A method according to claim 4 in which the RSO₂Hal compound is halogen substituted in the para position to the —SO₂Hal group.

6. A method according to claim 4 in which the NHR''R' compound is an amino compound.

7. A method according to claim 4 in which the R' of NHR''R' is an aromatic radical substituted in the paraposition by a sulphonic acid amide group.

8. A method according to claim 4 in which the NHR''R' compound is sulphanilic acid amide.

9. N-(p-sulfamyl-phenyl)-succinamic acid.

10. An alkali-metal salt of N-(p-sulfamyl-phenyl)-succinamic acid.

11. The sodium salt of N-(p-sulfamyl-phenyl)-succinamic caid.

12. Therapeutically valuable compounds having the following general formula:

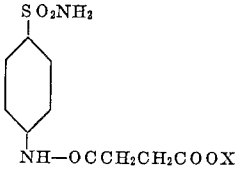

wherein X is a radical taken from the class consisting of hydrogen and alkali metal.

13. Therapeutically valuable compounds having the following general formula:

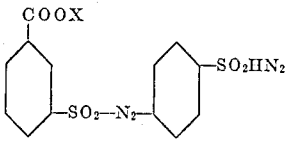

wherein X is a radical taken from the class consisting of hydrogen and alkali metal.

14. Therapeutically valuable compounds having the following general formula:

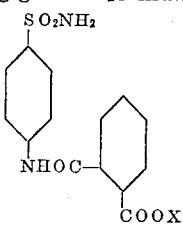

wherein X is a radical taken from the class consisting of hydrogen and alakali metal.

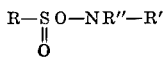

MAX DOHRN.
PAUL DIEDRICH.